United States Patent

[11] 3,615,331

| [72] | Inventors | Jean M. Peeters<br>Montreal, Quebec;<br>Wendel Offenbacher, St. Laurent, Quebec,<br>both of Canada |
|---|---|---|
| [21] | Appl. No. | 6,781 |
| [22] | Filed | Jan. 29, 1970 |
| [45] | Patented | Oct. 26, 1971 |
| [73] | Assignee | PPG Industries, Inc.<br>Pittsburgh, Pa. |
| [32] | Priority | Aug. 13, 1969 |
| [33] | | Canada |
| [31] | | 059,410 |

[54] APPARATUS FOR DRAWING GLASS SHEETS
17 Claims, 4 Drawing Figs.

[52] U.S. Cl............................................. 65/172,
65/196, 65/338, 65/344
[51] Int. Cl............................................. C03b 15/08
[50] Field of Search........................................ 65/171,
195, 196, 172, 173, 193, 338, 344

[56] References Cited
UNITED STATES PATENTS

| 2,269,445 | 1/1942 | Easter | 65/171 |
| 3,294,514 | 12/1966 | Zellers, Jr. | 65/196 |
| 3,397,976 | 8/1968 | Hynd | 65/344 |

Primary Examiner—Arthur D. Kellogg
Attorney—Cushman, Darby & Cushman

ABSTRACT: A two-piece drawbar of fused cast material is supported in the drawing kiln of glass drawing apparatus, the two drawbar pieces being held in aligned abutting end-to-end relation by devices which include compression springs for exerting a longitudinal compressive force on the drawbar while permitting longitudinal thermal expansion and contraction of the latter. The abutting end faces of the drawbar have grooves therein which correspond with each other to define apertures which snugly receive dowel members thereby to prevent misalignment of the drawbar sections during use.

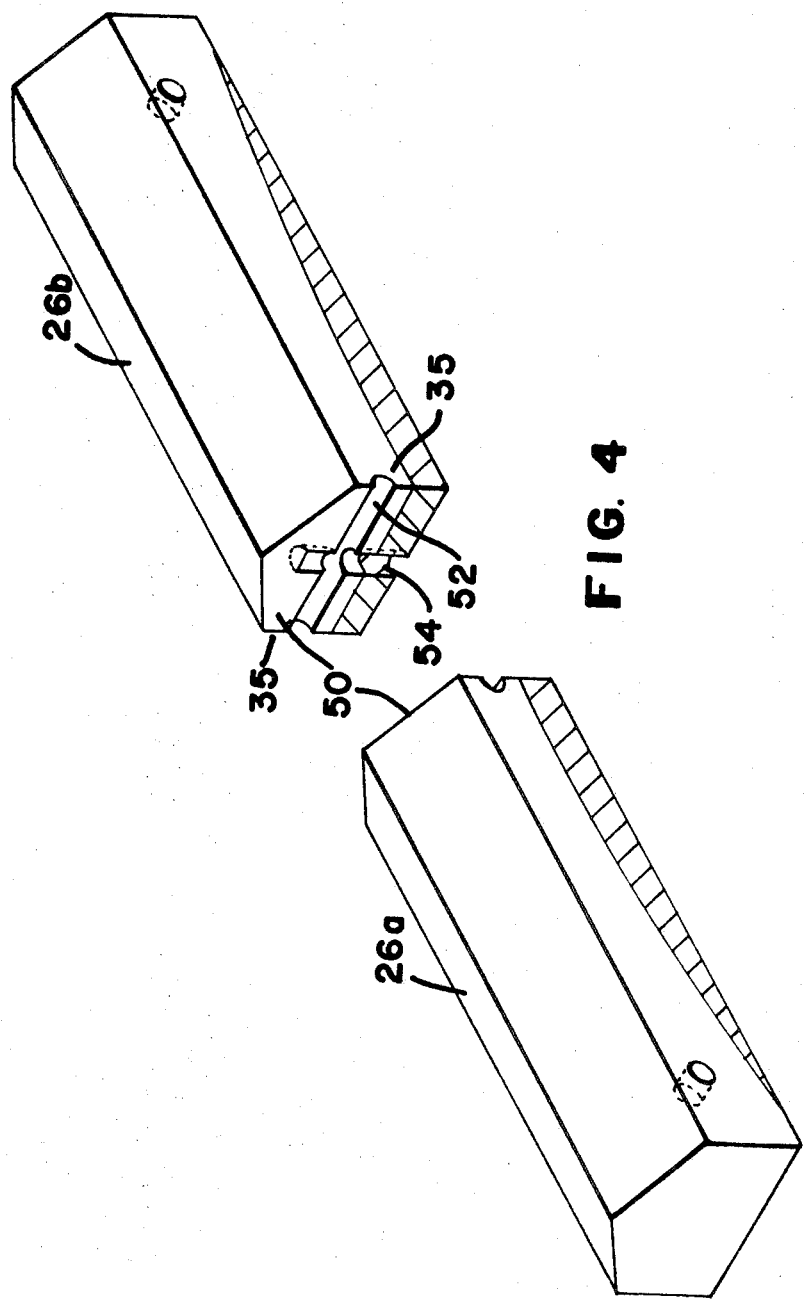

APPARATUS FOR DRAWING GLASS SHEETS

This invention relates to improvements in apparatus for the manufacture of sheet glass by the continuous ribbon drawing process, and more specifically to improvements in drawbar arrangements in or for glass drawing apparatus for carrying out the well-known Pennvernon process of drawing sheet glass.

Basically, the Pennvernon process consists of drawing a sheet of glass vertically upwards from the surface of a body of molten glass situated in the drawing kiln of a glass making furnace or "tank." In flowing from the furnace proper to the drawing kiln, the glass travels beneath the lower edge of a wall (known as the "shutoff") which projects downwardly a certain distance into the glass, but not to the floor of the kiln which may be 3 or 4 feet below the surface level of the glass. This shutoff serves, together with a front wall and two sidewalls, to define the area which constitutes the drawing kiln.

At a convenient position approximately equidistant between the front wall and the shutoff (although normally slightly nearer the front wall) there is positioned an elongated body (known as the "drawbar") extending across the drawing kiln from one sidewall to the other in a direction generally parallel with that of the front wall and the shutoff. This draw bar is supported by the sidewalls of the drawing kiln in a manner such that its upper surface is a few inches below the surface of the molten glass, the upper surface of the drawbar being shaped in a manner that aids in forming and locating the root or "gather" of the ribbon and in stabilizing the plane of the draw as the ribbon is drawn upwards by drawing machinery positioned above the drawing kiln.

Above the surface of the glass in the drawing kiln there is an enclosed space known as the "drawing chamber," this chamber being defined front and back by a pair of L-blocks extending across the drawing kiln from one sidewall to the other; at each end, by such sidewalls; beneath, by the feet of the L-blocks and the body of glass; and at the top, by the drawing machinery and other suitable closures. The ribbon of glass as it is drawn upwardly from the gather passes approximately up the center of this drawing chamber, and coolers in the form of metal tubes through which cooling water is pumped are situated within this drawing chamber to promote rapid cooling of the glass as the ribbon is being formed and as it moves upwardly in the drawing chamber. The drawing machinery includes a plurality of elongated rolls which grip the opposing surfaces of the glass sheet thereby to draw the latter upwardly. Drive mechanisms interconnecting the rolls drive the latter at a desired constant speed.

As mentioned previously, the present invention relates to improved drawbar arrangements in or for the equipment described above. In order to understand the invention, a knowledge of the prior art developments in this field is desirable. Until a few years ago, all drawbars were made of refractory clay. The manufacture of such drawbars included the steps of drying and shaping the drawbar and thereafter burning the latter at a high temperature (e.g. 2500° F.). The drawbar thus provided was placed in the molten glass within the drawing kiln while still hot.

The refractory clay drawbars possessed many disadvantages. Firstly, breakage of the drawbar during burning and handling was frequent. Defects in the drawn glass attributable to the clay drawbar increased as the clay drawbar deteriorated both by erosion and by slowly dissolving in the molten glass. As a result, replacement of these refractory clay drawbars had to be carried out several times during a tank campaign thus resulting in substantial production delays and attendant increases in manufacturing costs.

It therefore became desirable to replace the clay refractory drawbar by a drawbar of a fused cast material. The fused cast materials under consideration belong to the alumina-zirconia-silica family of electrically fused refractories having from 49–50.9 percent alumina, 33–36.5 percent zirconia, 11.4–15.0 percent silica and traces of iron and titanium. The exact composition of the fused cast material used in the preferred embodiment of the invention will be given later on in this specification. These materials, per se, are well known since they have been used for many years in other areas of the tank structure such as the walls and bottom of the drawing kiln. While fused cast drawbars have been found to have a life that is many, many, times as great as the life of the refractory clay drawbars, they do have some limitations. There is a limit to the size of fused cast drawbar that can be produced by the refractory industry; that is, it is not yet possible to produce a unitary fused cast drawbar having a length sufficient to extend completely across the drawing kiln from one sidewall to the other. Hence, it has been necessary to produce the drawbar as a plurality of sections which, when placed end to end provide a drawbar of length sufficient as to extend across the drawing kiln. Many European manufacturers have for years used fused cast drawbars consisting of up to 10 sections; however, unless the joints between the sections are accurately machined, lined up, and held in accurate alignment during operation, serious defects in the drawn sheet result.

More recently technical advances within the refractory industry have enabled the latter to produce longer and bigger refractory sections. At the present time the refractory industry is capable of producing fused cast drawbar sections up to 72 inches long with the result being that a two-piece fused cast drawbar can be made up of a length to fit not only the standard 100-inch (width) machine but also the wider 132-inch machine. Of course, with fewer sections making up the drawbar, the amount of grinding and drilling is reduced and perfect fit and alignment are easier to achieve; however, regardless of the number of sections used to make up the drawbar, it is still essential to maintain a perfect match at the joints between the sections to maintain perfect alignment of the sections, and to prevent any relative movement between the drawbar sections during the life of the drawbar. If the above conditions are not met, an imperfect joint between the drawbar sections will result which will cause optical distortion in the drawn glass sheet.

Accordingly, the objects of the invention are: to provide a multisection fused cast drawbar assembly constructed to provide a perfect, or almost perfect, match at the joints between the drawbar sections and to prevent misalignment and/or relative movement between the sections during the life of the drawbar, and to provide a kiln construction incorporating such multisection fused cast drawbar, such kiln construction incorporating means for maintaining the fused cast drawbar in its proper position within the kiln.

According to one aspect of the invention there is provided glass manufacturing apparatus of the type wherein a ribbon of glass is drawn upwardly from a body of molten glass comprising a kiln for holding the body of molten glass, said kiln including a pair of opposing sidewalls, means for drawing a ribbon of glass upwardly from the body of molten glass, a drawbar of a fused refractory material extending from one kiln sidewall to the other and disposed below the level taken by the upper surface of the body of molten glass, said drawbar adapted to aid in the formation of the glass ribbon, said drawbar comprising a plurality of sections held together in abutting end-to-end relation, means for exerting a longitudinal compressive force on the drawbar to support to the latter and hold the drawbar sections in their abutting end-to-end relation, and means associated with the end portions of the drawbar sections which are held in said abutting end-to-end relation to assist both in holding said sections in aligned relation and in preventing relative displacement therebetween.

According to a further feature of the invention each said drawbar end portion includes an end face which abuts the end face of the drawbar section next adjacent thereto, and wherein said last-mentioned means includes means associated with each end face to effect mutual engagement of the abutting end faces of the drawbar sections to prevent relative movement between said sections so long as they are held under the required degree of longitudinal compression.

According to a further feature of the invention the means associated with each end face includes a pair of grooves formed in each end face, said grooves in the end faces of the abutting drawbar sections cooperating with each other in such a way as to define a pair of apertures, and elongated members disposed in said apertures and adapted to fit closely therein, said apertures being angularly disposed with respect to each other.

According to a still further feature of the invention the opposite ends of said drawbar are supported by said kiln sidewalls with the drawbar ends abutting the sidewalls and wherein the means for exerting a longitudinal compressive thrust on the drawbar comprises means resiliently forcing the kiln sidewalls towards one another whereby such resilient force is transmitted between said sidewalls via said drawbar thereby to support the latter, with the means for exerting the force being capable of taking up thermal expansion and contraction of the drawbar during heating and cooling of the kiln.

A preferred embodiment of the invention will be described with reference to the accompanying drawings in which;

FIG. 4 is a perspective view of the two-piece fused cast drawbar per se.

Figure 1:
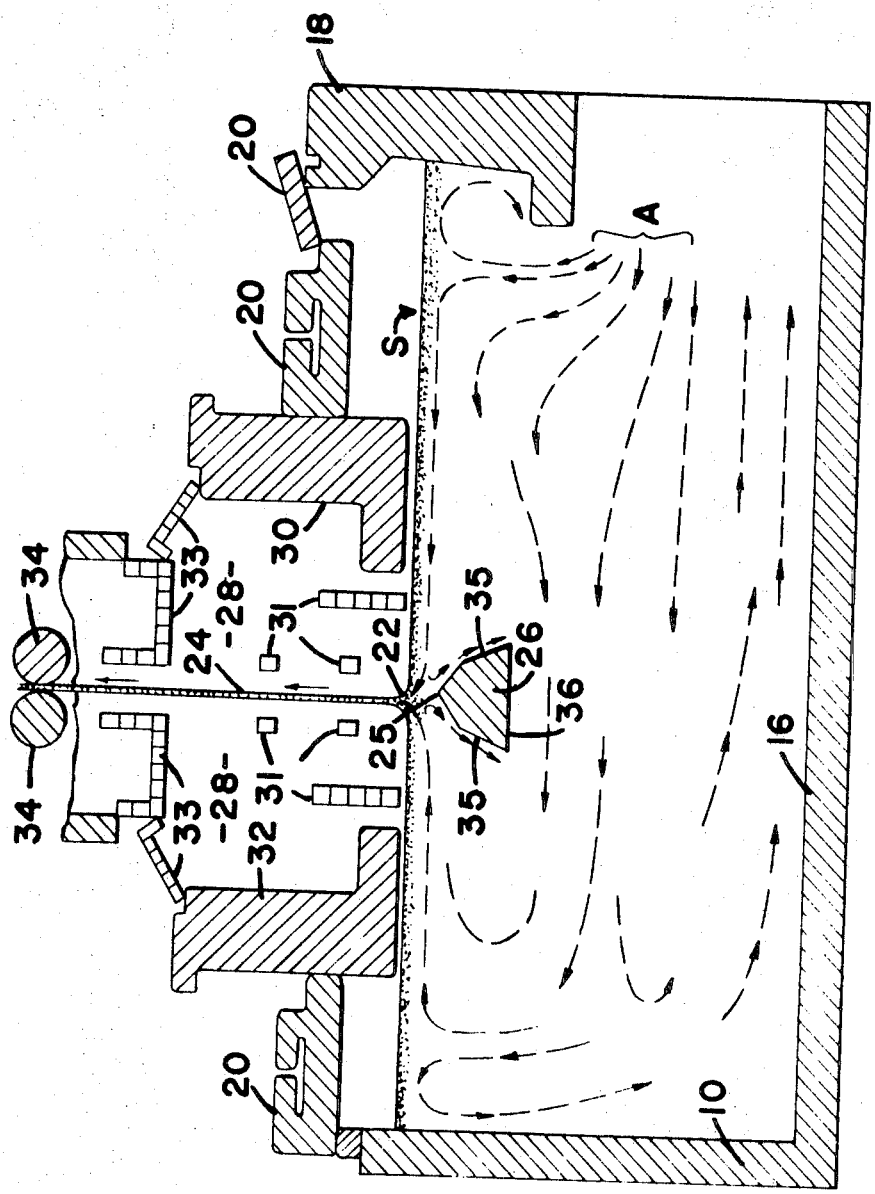
FIG. 1 is an elevation view in cross section of a drawing kiln illustrating a ribbon of glass being continuously drawn from a bath of molten glass, such cross section view being taken in a plane perpendicular to the longitudinal axis of the drawbar.

The drawing kiln shown in FIG. 1 is defined by a front wall 10, two sidewalls 12 and 14 (FIG. 2), a floor 16, a shutoff 18 and curtain blocks 20 which act as a ceiling. All these parts are made of a suitable hard refractory material that will adequately withstand temperatures of the order of 2100° F. to 2200° F. Glass flows into this kiln under the shutoff 18 from the main body of the glassmaking furnace as suggested by the arrows A in FIG. 1, this glass entering the drawing kiln at a carefully regulated temperature determined by the furnace controls and achieving a level in the kiln shown by the surface S. FIG. 1 shows how this glass is drawn up at the gather 22 into a ribbon 24 along an area generally above the apex 25 of a fused cast drawbar 26 which is positioned a short distance below the glass surface S. The ribbon 24 passes through the drawing chamber 28 principally defined by L-blocks 30 and 32 and containing banks of coolers 31. The ceiling of the drawing chamber 28 is chiefly defined by a further group of coolers 33. The upward movement of the ribbon 24 is provided by a series of pairs of rollers of the drawing machinery situated above the kiln, only the first pair of rollers 34 being visible in FIG. 1. The ribbon 24 is cooled as it rises, firstly by the banks of coolers 31 and subsequently by coolers 31 and by the air, and at a convenient point well above the drawing kiln it is cut into lengths of the required size.

It will be noted from the drawings that some parts of this kiln are not completely symmetrically arranged. For example the front L-block 32 is slightly nearer the glass surface S than the rear L-block 30. Also the drawbar 26 is arranged such that its apex 25 is not exactly under the gather 22. These features of asymmetry are conventional in a drawing kiln and derive from the fact that the front wall 10 is at a lower temperature than the rear of the kiln, thus introducing a need to provide compensating factors to obtain substantial symmetry of temperature between the two approaches to the gather.

Figure 2:
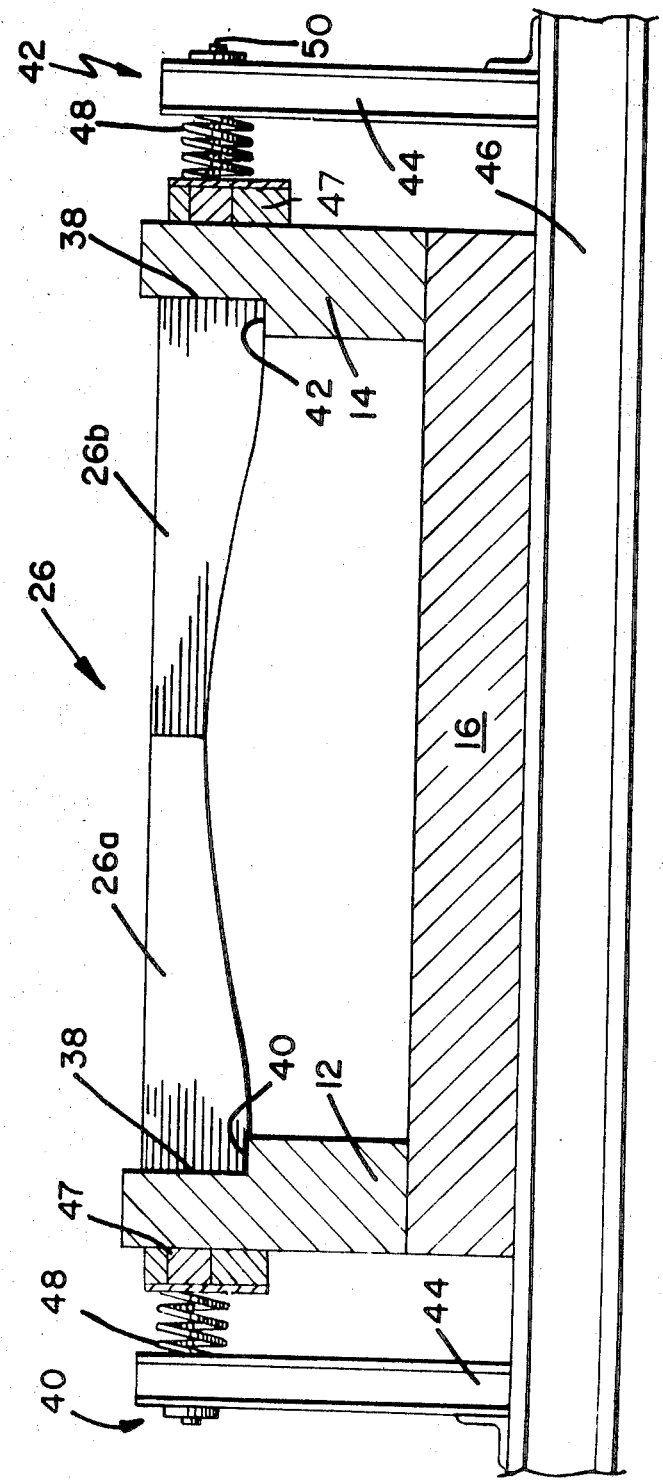
FIG. 2 is a fragmentary diagrammatic view of the lower portion of the glass drawing kiln taken in a cross-sectional plane parallel to the longitudinal axis of the drawbar.

The drawbar 26 is in two sections, 26a and 26b, each of equal length, and as seen clearly in FIG. 2, these two sections are positioned in abutting end-to-end relation within the drawing kiln such that the drawbar extends from one sidewall 12 to the opposite sidewall 14. It will be seen that the sidewalls 12 and 14 each include a recess 38 therein of sufficient width as to accommodate the respective opposing ends of the drawbar, such recesses 38 defining shoulder portions 40, 42 on the respective sidewalls 12 and 14, which shoulder portions serve to support and position the opposite ends of the drawbar.

Figure 3:
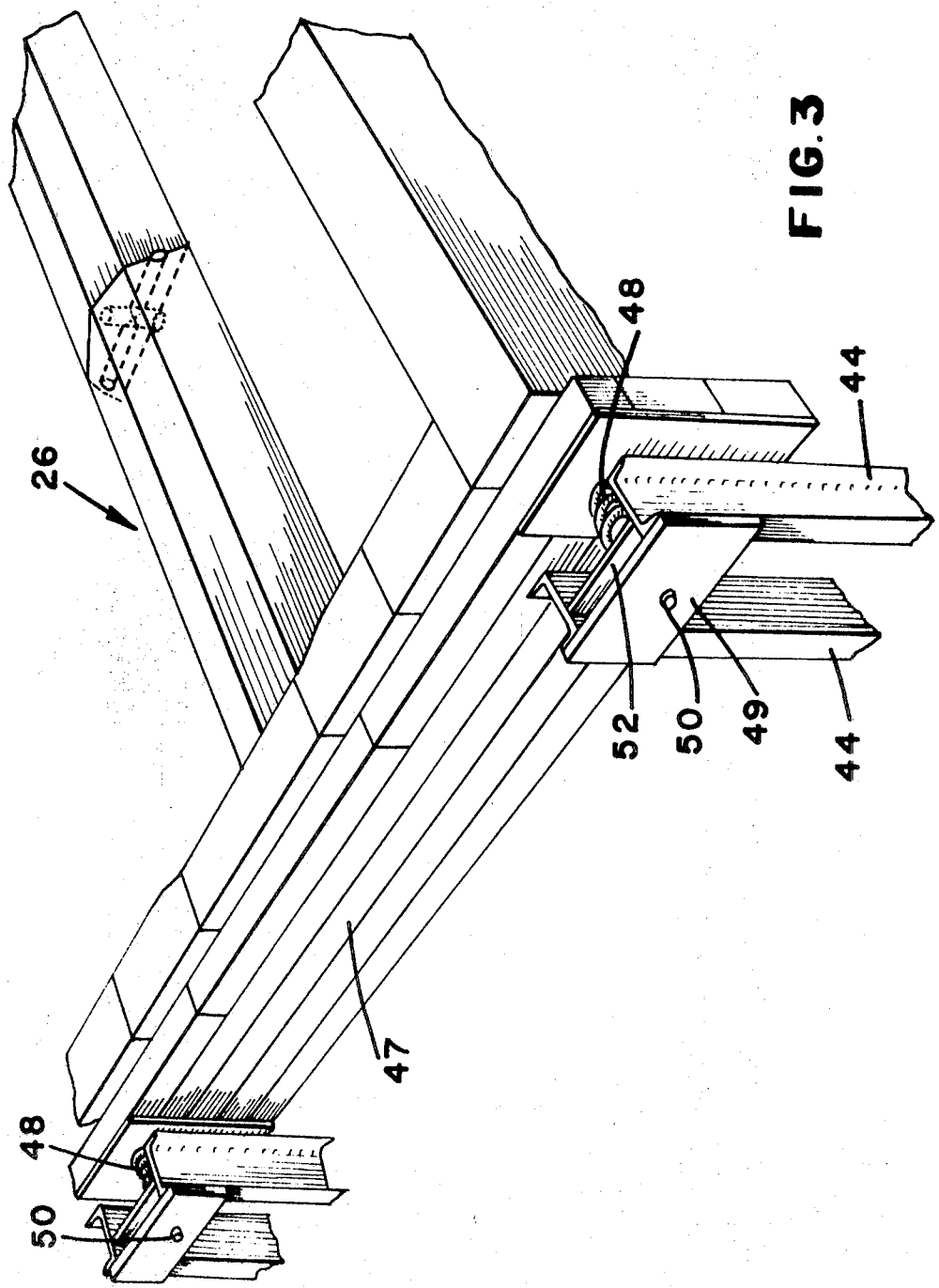
FIG. 3 is a perspective view of a fragment of the drawbar and the drawing kiln in which the drawbar is supported.

In order to support the two sections 26, 26a of the drawbar in abutting aligned end-to-end relation, means are provided to exert longitudinal compressive force on the drawbar 26 of sufficient magnitude as to maintain the drawbar sections in their proper positions at all times. Referring to FIGS. 2 and 3 it will be seen that there are provided assemblies 40, 42 disposed in flanking, spaced relation to the kiln sidewalls 12 and 14 respectively. Each assembly 40, 42 includes a spaced pair of uprights 44 each of which are rigidly connected to the structural steel frame 46 which underlies and supports the kiln bottom 16. The pairs of uprights 44 are spaced outwardly on either side of the vertical plane passing along the longitudinal axis of the drawbar 26. Interposed between the uprights 44 and their associated kiln sidewalls 12 and 14, and disposed in juxtaposition to the sidewalls 12 and 14 are sidewall support members 46 and 47 respectively. Each sidewall support member comprises an elongated rigid member of sufficient width as to be capable of transmitting a compressive force on the whole of the sidewall portions contacting the opposing ends of the drawbar. The sidewall support members are biased into engagement with sidewalls 12 and 14 by means of coil compression springs 48 which are disposed between the uprights 44 and the sidewall support members 46, 47. The compressive force exerted by each spring 48 may be varied by rotating adjustment screws 50 (FIG. 3) which are mounted in plates 49 bolted to each of the uprights 44, screws 50 serving to vary the position of bearing plates 52 against which one end of each spring 48 bears. The compressive thrusts of springs 48 are transmitted to the sidewalls 12, 14 thus tending to force the latter towards each other. This thrust force is exerted along the longitudinal axis of the drawbar 26. Compression springs 48 must, of course, be capable of exerting sufficient force on the sidewalls of the kiln as to provide at least the minimum longitudinal compressive force on drawbar 26 required to maintain its two sections 26a, 26b in their end-to-end aligned positions at all times, including during the initial heat up to working temperature (1800°–2000° F.) and later on each time the drawing kiln is reheated. The compression springs also serve to take up the drawbar expansion and contraction which occur as a result of temperature changes. It will be seen that the compressive force required by springs 48 is a function of the length and weight of the drawbar, as well as the drawbar depth (i.e. its apex to bottom surface dimension) particularly at the region of the drawbar where the two drawbar sections contact each other.

The drawbar structure, per se, is seen most clearly in FIG. 4. It will be seen that the drawbar 26 has a cross-sectional outline the upper portion of which is in the form of an inverted shallow V, with sidewalls 35 extending downwardly from such upper portion, and a bottom 36 which appears straight in cross section. The apex 25 mentioned previously is defined by the upper extremity of the inverted V-shape portion. Other cross-sectional shapes may, of course, be employed in the practice of the invention. It is also desirable that the bottom of the drawbar be of a concave configuration as would be produced upon removal of the material indicated by the shaded lines. This concave configuration provides for better control of sheet thickness. The material of the drawbar preferably comprises:

| Silica | $(SiO_2)$ | 12% |
| Zirconia | $(ZrO_2)$ | 36% |
| Alumina | $(Al_2O_3)$ | 50% |
| Ferrous Oxide | $(Fe_2O_3)$ | 0.1% | with the balance comprising titanium oxides and/or impurities. Such drawbars may be obtained from Walsh Refractories Limited, St. Louis, Mo.

In order to provide as near perfect a match at the joints between the sections 26a, 26b of the drawbar, the end faces 50 which abut each other when the drawbar is assembled are ground smooth to provide a good fit. Both of these faces are perpendicular to the longitudinal axis of the drawbar.

Disposed in each end face 50 is a transverse groove 52 extending from one sidewall 35 to the other of hemicircular outline in cross section. At right angles to each groove 52 is a further groove 54 which extends from the bottom face 36 of each drawbar section upwardly, thence intersecting groove 52 and continuing upwardly beyond groove 52 to terminate short of the apex 25 of the drawbar. Each groove 54 is also of hemicircular outline in cross section.

In practice, the hemicircular in cross section grooves are formed by drilling in the following manner. The two drawbar sections are carefully assembled in their correct aligned, end-to-end positions, and held there by a rigid frame. A diamond drill is then used to drill with great accuracy a pair of intersecting holes, the centerlines of the two holes lying in the common abutment plane between the two drawbar sections, whereby the above-mentioned hemicircular grooves 52 and 54 are formed. A set of cylindrical dowels 56 (FIG. 3) of the same material as the drawbar are then diamond ground for as near a perfect fit as possible in the corresponding grooves in the drawbar sections. When the drawbar sections 26a, 26b are assembled in the drawing kiln and the dowels inserted in the holes provided by the corresponding grooves 52 and 54 in the abutting end faces 50 the assembled unit is practically jointless and no relative movement of the drawbar sections can take place so long as they are held under the required degree of longitudinal compression. The tight fit of the dowels in the mating sets of grooves 52 and 54 ensured by the careful grinding and drilling operations mentioned above prevents movement of the dowels during use.

Although the invention has been described in its preferred form with a certain degree of particularity, it is to be understood that the present disclosure of the preferred form of the invention has been made only by way of example and that numerous changes in the details of construction and the combination and arrangements of parts may be resorted to without departing from the spirit and the scope of the invention as hereinafter claimed.

We claim:

1. Glass manufacturing apparatus of the type wherein a ribbon of glass is drawn upwardly from a body of molten glass comprising;
   a. a kiln for holding the body of molten glass, said kiln including a pair of opposing sidewalls;
   b. means for drawing a ribbon of glass upwardly from the body of molten glass,
   c. a drawbar of a fused refractory material extending from one kiln sidewall to the other and disposed below the level taken by the upper surface of the body of molten glass, said drawbar adapted to aid in the formation of the glass ribbon, said drawbar comprising a plurality of sections held together in abutting end-to-end relation,
   d. means for exerting a longitudinal compressive force on the drawbar to support the latter and hold the drawbar sections in their abutting end-to-end relation,
   e. and means associated with the end portions of the drawbar sections which are held in said abutting end-to-end relation to assist both in holding said sections in aligned relation and in preventing relative displacement therebetween.

2. The apparatus according to claim 1 wherein each said drawbar end portion includes an end face which abuts the end face of the drawbar section next adjacent thereto, and wherein said last-mentioned means includes means associated with each end face to effect mutual engagement of the abutting end faces of the drawbar sections to prevent relative movement between said sections so long as they are held under the required degree of longitudinal compression.

3. The apparatus according to claim 2 wherein the means associated with each end face includes a pair of grooves formed in each end face, said grooves in the end faces of the abutting drawbar sections cooperating with each other in such a way as to define a pair of apertures, and elongated members disposed in said apertures and adapted to fit closely therein, said grooves being angularly disposed with respect to each other.

4. The apparatus according to claim 3 wherein said grooves each have a hemicircular outline in cross section.

5. The apparatus according to claim 4 wherein said grooves are arranged such that their longitudinal axes intersect each other.

6. The apparatus according to claim 5 wherein a first corresponding and cooperating pair of grooves is vertically disposed, with the second corresponding and cooperating pair of grooves being horizontally arranged.

7. The apparatus according to claim 4 wherein the elongated members disposed in the apertures formed by the corresponding and cooperating grooves in the end faces of said sections comprise cylindrical dowels having exterior cylindrical surfaces adapted to fit tightly into said apertures.

8. The apparatus according to claim 1 wherein said drawbar comprises two of said sections.

9. The apparatus according to claim 4 wherein said drawbar comprises two of said sections.

10. The apparatus according to claim 1 wherein the opposite ends of said drawbar are supported by said kiln sidewalls with the drawbar ends abutting the sidewalls and wherein the means for exerting a longitudinal compressive thrust on the drawbar comprises means resiliently forcing the kiln sidewalls towards one another whereby such resilient force is transmitted between said sidewalls via said drawbar thereby to support the latter, with the means for exerting the force being capable of taking up thermal expansion and contraction of the drawbar during heating and cooling of the kiln.

11. The apparatus according to claim 3 wherein the opposite ends of said drawbar are supported by said kiln sidewalls with the drawbar ends abutting the sidewalls and wherein the means for exerting a longitudinal compressive thrust on the drawbar comprises means resiliently forcing the kiln sidewalls towards one another whereby such resilient force is transmitted between said sidewalls via said drawbar thereby to support the latter, with the means for exerting the force being capable of taking up thermal expansion and contraction of the drawbar during heating and cooling of the kiln, said drawbar comprising two sections only, and said kiln sidewalls including recessed regions defining shoulder portions for supporting the opposing ends of the drawbar.

12. The apparatus according to claim 1 wherein said drawbar comprises a fused cast refractory material of the alumina-zirconia-silica family of refractory compositions.

13. The apparatus according to claim 3 wherein said drawbar comprises from about 49 percent to about 50.9 percent by weight alumina, from about 33 to about 36.5 percent zirconia, from about 11.4 to 15 percent silica with the remainder comprising traces of iron and titanium oxides and impurities.

14. A fused cast drawbar section made from a fused cast refractory material and adapted to be held in abutting end-to-end relation with another drawbar section of the same construction, said drawbar section having a substantially planar end face in which is formed at least one pair of grooves which are angularly disposed with respect to each other and which are arranged to receive and engage elongated dowel members when the planar end face of said another drawbar section of the same construction is brought into said abutting relation with the first-mentioned drawbar section.

15. The drawbar section according to claim 14 wherein each of said grooves is of hemicircular outline in cross section.

16. The drawbar section according to claim 15 wherein said grooves are disposed generally at right angles to one another.

17. The drawbar section according to claim 14 wherein said refractory material comprises from about 49 percent to about 50.9 percent by weight alumina, from about 33 to about 36.5 percent zirconia, from about 11.4 to 15 percent silica with the remainder comprising traces of iron and titanium oxides and impurities.